United States Patent Office

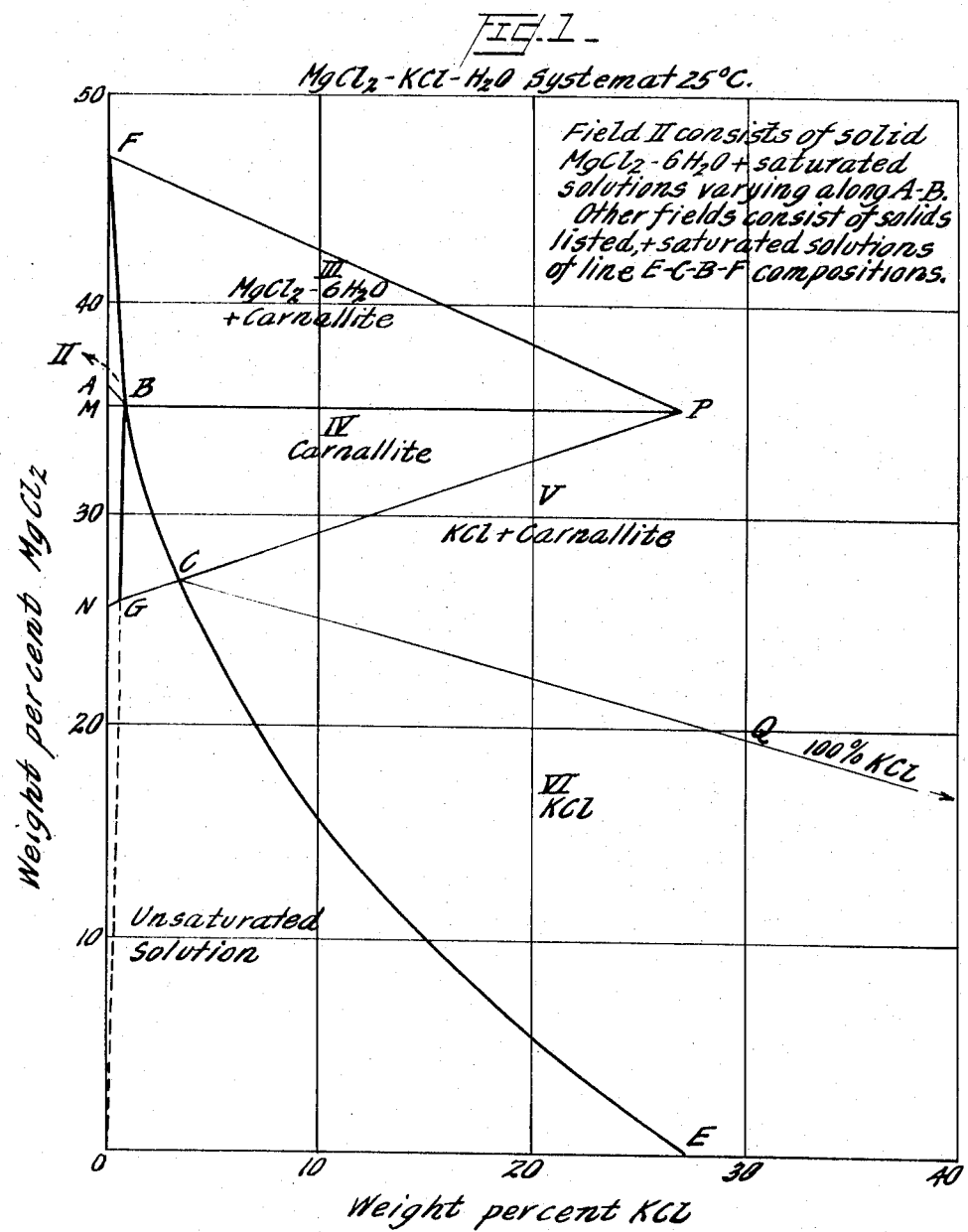

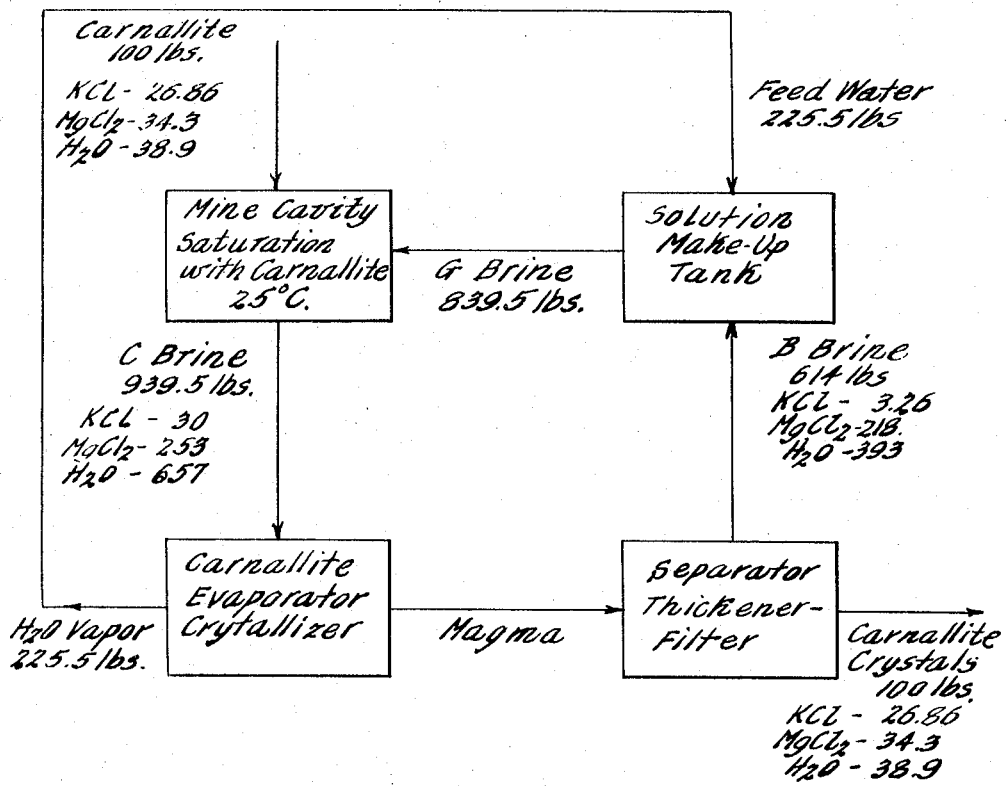

3,355,212
Patented Nov. 28, 1967

3,355,212
SOLUTION MINING OF CARNALLITE
Robert Wilson Day, Henrico County, Va., assignor to Reynolds Metals Company, Henrico County, Va., a corporation of Delaware
Filed July 2, 1965, Ser. No. 469,233
12 Claims. (Cl. 299—5)

ABSTRACT OF THE DISCLOSURE

The solution mining of carnallite ($KCl \cdot MgCl_2 \cdot 6H_2O$) from an underground deposit thereof is performed by contacting the deposit with an aqueous solution of potassium chloride and magnesium chloride in concentrations corresponding to phase diagram relationships whereby the carnallite is dissolved without decomposition of the ore.

---

This invention relates to a novel method for the solution mining of carnallite. More particularly, the invention concerns a method for extracting carnallite from underground deposits by means of an aqueous extractant while avoiding decomposition of the carnallite.

Carnallite, $KCl \cdot MgCl_2 \cdot 6H_2O$ is an important potash ore, being found in the Delaware basin area of New Mexico and the Paradox basin of Utah, but these deposits have not been extensively exploited, either by dry mining or by solution methods. In the United States, the major proportion of potash production is derived from sylvinite, a mixture of halite NaCl and sylvite KCl, langbeinite $2MgSO_4 \cdot K_2SO_4 \cdot 2H_2O$, or polyhalite, ores found in the Carlsbad area of New Mexico. These ores are mined largely by conventional underground mining methods. In Canada, sylvite ores are mined in large tonnage by solution methods based upon principles of differential or selective solution. These methods employ differences in temperature-solubility relationships between the major constitutents of the ore, such as, for example, the KCl and NaCl of sylvinite. In solutions saturated with both salts, the solubility of KCl increases rapidly with temperature, while that of NaCl remains essentially constant. It has also been proposed, in order to avoid certain drawbacks of selective solution, to extract sylvinite from subterranean deposits by dissolving with an aqueous extractant containing potassium and sodium chlorides in a concentration such that the extractant will then dissolve further potassium chloride and sodium chloride in approximately their weight ratio in the ore deposit, as disclosed, for example, in U.S. Patent 3,058,729. Thereafter, the extract is cooled to cause crystallization of solid potassium chloride. The foregoing methods are not adaptable to the recovery of carnallite, however, and the problem of extracting this mineral as such by solution mining has remained unsolved.

One of the difficulties to be overcome in solution mining of carnallite lies in the fact that, when contacted with water, the mineral separates or decomposes into its constituents, the magnesium chloride going into solution, the potassium chloride dissolving to a minor extent. The remainder of the potassium chloride stays in the underground cavity as a solid, or else is entrained as a solid in slurry form and brought to the surface during pumping operations. The solid tends to produce mechanical difficulties.

In accordance with the present invention, there is provided a novel method for the efficient and economical extraction of carnallite which avoids the aforementioned difficulties, and which is based upon molar solubility relationships in the system $KCl\text{-}MgCl_2\text{-}H_2O$.

The relationships in the ternary system $KCl\text{-}MgCl_2\text{-}H_2O$ are shown in the phase diagram which forms FIGURE 1 of the accompanying drawings. It will be seen from the diagram that the area designated IV includes compositions stable to carnallite. Any solution in the area BMNGC would theoretically dissolve carnallite without decomposition. In accordance with the preferred practice of the invention, carnallite extracting solutions are employed which are located in the magnesium-poor, potassium-poor region of the area bounded by BCG. Hence, solutions B, C and G of the phase diagram are the limiting solutions. Thus, if a solution more dilute than G in $MgCl_2$ is employed, some decomposition of the carnallite will take place. At the same time, the extracting solutions must be as dilute as possible in both components to permit a high rate of solution of the carnallite while still preventing its decomposition.

Thus, in accordance with the invention, there is provided a novel method of forming an aqueous solution of carnallite which comprises contacting the carnallite with an aqueous extractant comprising a solution of potassium chloride and magnesium chloride in concentrations corresponding to phase diagram relationships which render the extractant capable of dissolving the carnallite without decomposition of the carnallite.

As applied to the solution mining of carnallite from underground deposits thereof, the invention further provides a novel method whereby the deposit is contacted with the aforesaid aqueous extractant, the resulting carnallite solution is removed from the deposit, brought to the surface, and the carnallite is recovered from the solution, without decomposition, by suitable concentration and crystallization. The resulting mother liquor is then diluted with water to the concentrations of the aqueous extractant, and the extractant is recycled to the underground deposit.

Further, in accordance with the invention, there is employed for the solution of carnallite, a brine comprising an aqueous solution of potassium chloride and magnesium chloride containing not less than about 25% by weight of magnesium chloride, and having a weight ratio of $MgCl_2$ to $KCl$ of not less than about 8.3 to 1. This ratio is applicable at a temperature of about 25° C. The weight ratio of $MgCl_2$ to $KCl$ diminishes with increase in temperature, so that at 83° C., for example, the ratio becomes about 5.25 to 1.

Preferably, for extraction at about 25° C. the extracting solution or brine will contain between about 25% and about 31% of $MgCl_2$ by weight, and have a weight ratio of $MgCl_2$ to $KCl$ of not less than about 12 to 1. With the same $MgCl_2$ content at 80° C. the $MgCl_2:KCl$ ratio will be above about 8 to 1. The percent $MgCl_2$ present does not vary substantially with rise in temperature. The variations in $MgCl_2$ and KCl content, and in the $MgCl_2:KCl$ ratio, permit control over supersaturation conditions, crystal seeding conditions, or other kinetic considerations of an unpredictable nature which may be present in a given situation.

The preferred extraction brine for use at about 25° C. falls within the area BCG of the phase diagram and has the composition:

|  | Pounds | Percent |
|---|---|---|
| KCl | 3.26 | 0.4 |
| $MgCl_2$ | 218.0 | 26.0 |
| $H_2O$ | 618.5 | 73.0 |
| Total | 839.5 | 100.0 | and the practice of the invention will be illustrated with regard to this solution, although it will be understood that the invention is not limited thereto.

The carnallite mineral dissolves unchanged in the extraction brines of the invention, and can be recovered therefrom in its original state, and without decomposition.

The method of the invention is adapted to the extraction of carnallite from underground deposits, such as those in New Mexico and Utah, where the mineral occurs in horizontal strata at depths ranging from several hundred to several thousand feet. In the solution mining of such deposits, a boring is conventionally made through the overlying strata to reach the upper surface of the deposit. The boring is lined with a metal casing and a pipe is extended through and concentrically with the casing to establish an annulus between the pipe and casing for subsequent removal of extraction brine and its carnallite content. The central pipe or conduit extends to a considerable depth into the deposit. Brine or water is first pumped into the well to establish a solution cavity in the deposit, in accordance with conventional methods. The size of the cavity is advantageously one in which the depth in relation to the diameter or breadth is as great as possible. A suitable cavity size can be, for example, diameter 50 feet, height 50 feet.

In the accompanying drawings,

FIGURE 1 is a diagram showing phase relationships in the system $KCl-MgCl_2-H_2O$; and FIGURE 2 is a flow diagram illustrating a preferred embodiment of the solution mining method of the invention for carnallite.

In addition to known bedded deposits of 90–95% pure carnallite, there are extensive deposits of carnallite with halite (NaCl) and sylvite (KCl) interbedded or interspersed. These may contain up to 30% sylvite and 40% halite. The solution method of the invention is applicable to the mining of carnallite from such mixed deposits. The extracting solution can be adjusted as to composition so as to be nearly saturated with NaCl. There is little tendency for NaCl to crystallize on the faces of the carnallite crystals, as in solution mining of sylvite, owing to differences in the crystal structures of carnallite and halite.

The solution mining of carnallite is essentially adiabatic in respect to heat relationships, unless very high flow rates are employed. The solution of carnallite is endothermic, but a temperature drop of less than 1° C. is involved. This slight temperature drop will not slow down the rate of solution substantially, but, if desired, the endothermic effect may be diminished by addition of a chemical, such as ammonia. In any case, external heat can be supplied to the system, as by using an extractant brine at elevated temperature, to accelerate solution of the mineral.

The rate of extraction can also be increased, in accordance with the invention, by using agitation with a gas capable of forming bubbles at the dissolving crystal interfaces or in nuclei in solution to produce a mixing effect. Thus, for example, the brine may be saturated with a gas such as ammonia or carbon dioxide, under pressure, and the pressure then released to induce gassing and consequent agitation while in the cavity.

The following examples illustrate the practice of the invention, taken with the flow sheet of FIG. 2 of the drawings, but are not to be considered as limiting:

*Example 1*

Utilizing as the extractant the preferred composition previously given, the flow sheet of FIG. 2 indicates the mining and recovery of carnallite crystals containing 26.86% KCl, 34.3% $MgCl_2$, and 38.9% combined water, by weight. For a cylindrical cavity 50 feet in diameter and 100 feet in depth, an overall rate of solution of carnallite is about 0.2 lb. per hour per square foot of active cavity surface, thus yielding 3,140 pounds of carnallite per hour or about 13,000 tons per year. The specific solution rate may vary to as high as 1 lb. per square foot per hour depending on the deposit mined, solution used, temperature in the cavity, agitation, or the use of exothermic reagents.

In order to mine 100 pounds of carnallite at 25° C., essentially 839.5 lbs. of extracting brine must be used and 225.5 lbs. of water must be evaporated.

The mine cavity is filled with extractant brine, designated G in the flow sheet, which contains 3.26 lbs. KCl, 218.0 lbs. $MgCl_2$, and 618.5 lbs. water (0.4% KCl, 26.0% $MgCl_2$, 73.6% $H_2O$), part of which has been supplied as make-up water. Saturation of the extractant brine with carnallite results in a solution containing 30 lbs. KCl, 253 lbs. $MgCl_2$, and 657 lbs. water (3.2% KCl, 26.9% $MgCl_2$, 69.9% $H_2O$) designated brine C. This brine is discharged from the well head and transferred to a carnallite evaporator and crystallizer, wherein evaporation is carried to a point corresponding to the removal of approximately 225.5 lbs. water from the extract. The carnallite crystallizes out undecomposed in the form of a magma. The crystal magma is treated in a thickener-filter yielding crystals having the same composition as the original carnallite deposit.

The mother liquor from the carnallite crystallization is a saturated brine designated B having the composition 3.26 lbs. KCl, 218 lbs. $MgCl_2$ and 393 lbs. water (0.53% KCl, 35.5% $MgCl_2$, 69.97% $H_2O$) totalling 614 lbs. Make-up water in the amount of 225.5 lbs. is supplied from a tank and admixed with brine B to reconstitute extractant brine G, totalling 839.5 lbs. The extractant brine G, thus reconstituted, is recycled to the mine cavity to dissolve more carnallite.

*Example 2*

Proceeding as in Example 1, the extractant solution G is saturated with ammonia gas under pressure, and the thus treated extractant is pumped into the carnallite cavity to increase extraction temperature and to provide agitation. The recycle extractant is treated with ammonia gas to restore the saturated condition.

What is claimed is:

1. Method of forming an aqueous solution of carnallite without decomposition of the carnallite which comprises contacting carnallite with an aqueous solution of potassium chloride and magnesium chloride containing between about 25% and about 31% magnesium chloride by weight, and having a weight ratio of magnesium chloride to potassium chloride of not less than about 8.3 to 1.

2. Method of forming an aqueous solution of carnallite without decomposition of the carnallite which comprises contacting carnallite with an aqueous solution comprising about 0.4% by weight of potassium chloride, and about 26% by weight of magnesium chloride.

3. Method of solution mining carnallite from an underground deposit thereof comprising the steps of contacting said deposit with an aqueous extractant comprising a solution of potassium chloride and magnesium chloride in concentrations corresponding to phase diagram relationships which render said extractant capable of dissolving carnallite without decomposition of the carnallite, removing the resulting carnallite solution from the deposit, and recovering the carnallite from the solution.

4. Method of solution mining carnallite from an underground deposit thereof comprising the steps of contacting said deposit with an aqueous solution of potassium chloride and magnesium chloride containing between about 25% and about 31% by weight of magnesium chloride, and having a weight ratio of magnesium chloride to potassium chloride of not less than about 8.3 to 1, removing the resulting carnallite solution from the deposit, and recovering the carnallite from the solution.

5. Method of claim 4 in which the temperature of the aqueous solution is about 25° C.

6. Method of solution mining carnallite from an underground deposit thereof comprising the steps of contacting said deposit with an aqueous extractant comprising about 0.4% by weight of potassium chloride, and about 26% by weight of magnesium chloride, removing the resulting carnallite solution from the deposit, and recovering the carnallite from the solution.

7. Method of solution mining carnallite from an underground deposit thereof comprising the steps of contacting said deposit with an aqueous extractant comprising a solution of potassium chloride and magnesium chloride in concentrations corresponding to phase diagram relationships which render said extractant capable of dissolving carnallite without decomposition of the carnallite, removing the resulting carnallite solution from the deposit, concentrating the solution to crystallize carnallite therefrom, separating and diluting the mother liquor to the said concentration to reconstitute said extractant, and recycling the extractant to said deposit.

8. The method of claim 4 which includes the further steps of concentrating the carnallite solution to crystallize carnallite therefrom, separating and diluting the mother liquor to the said concentrations to reconstitute said extractant, and recycling the extractant to said deposit.

9. The method of claim 6 which includes the further steps of concentrating the carnallite to crystallize carnallite therefrom, separating and diluting the mother liquor to the said concentrations to reconstitute said extractant, and recycling the extractant to said deposit.

10. The method of claim 8 in which the temperature of the extractant is about 25° C.

11. The method of claim 7 in which the aqueous extractant is saturated with a gas under pressure.

12. The method of claim 10 in which the gas is ammonia.

References Cited
UNITED STATES PATENTS

| | | | |
|---|---|---|---|
| 1,304,097 | 5/1919 | Reeve | 23—38 |
| 2,029,623 | 2/1936 | Kircher et al. | 23—312 |
| 2,685,438 | 8/1954 | Cross | 299—5 |

ERNEST R. PURSER, *Primary Examiner.*